United States Patent
Sampath et al.

(10) Patent No.: US 10,664,142 B2
(45) Date of Patent: May 26, 2020

(54) AIRCRAFT DATA ENTRY SYSTEM

(71) Applicant: HONEYWELL INTERNATIONAL INC., Morris Plains, NJ (US)

(72) Inventors: Mahesh Kumar Sampath, Tamilnadu (IN); Vasantha Selvi Paulraj, Karnataka (IN); Karthic V, Tamilnadu (IN); Sivaprakash Pasupathi, Tamilnadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 185 days.

(21) Appl. No.: 15/973,591

(22) Filed: May 8, 2018

(65) Prior Publication Data

US 2019/0346992 A1   Nov. 14, 2019

(51) Int. Cl.
| | |
|---|---|
| *G06F 3/0484* | (2013.01) |
| *B64D 45/00* | (2006.01) |
| *G06F 3/0488* | (2013.01) |
| *G06F 3/16* | (2006.01) |
| *G10L 15/26* | (2006.01) |
| *G06F 40/205* | (2020.01) |

(52) U.S. Cl.
CPC ......... *G06F 3/04842* (2013.01); *B64D 45/00* (2013.01); *G06F 3/04886* (2013.01); *G06F 3/167* (2013.01); *G06F 40/205* (2020.01); *G10L 15/265* (2013.01)

(58) Field of Classification Search
CPC ...... G06F 3/048; G06F 3/0482; G06F 3/0484; G06F 3/0488; G06F 3/16; G10L 15/26; B64D 45/00; G08G 5/00
See application file for complete search history.

(56) References Cited

U.S. PATENT DOCUMENTS

| | | | |
|---|---|---|---|
| 6,980,198 B1 | 12/2005 | Gyde et al. | |
| 7,418,319 B2 | 8/2008 | Chen et al. | |
| 9,032,319 B1 | 5/2015 | Hammack et al. | |
| 9,858,823 B1* | 1/2018 | Lynn | G08G 5/0034 |
| 2007/0180394 A1* | 8/2007 | Hedrick | G06F 3/04847 715/771 |
| 2012/0265372 A1* | 10/2012 | Hedrick | H04L 67/36 701/3 |
| 2016/0103579 A1* | 4/2016 | Coulmeau | G08G 5/0021 701/533 |

* cited by examiner

*Primary Examiner* — Xiomara L Bautista
(74) *Attorney, Agent, or Firm* — Lorenz & Kopf, LLP

(57) ABSTRACT

Systems and methods are provided for entering data into a data entry system. The data entry system includes a user-control device coupled to a display configured to display data field entry locations. The system includes a receiving module for receiving input data. The system includes a parsing module connected to the receiving module for parsing the input data and identifying constituent data elements in the input data. The system also includes a contextual tagging module connected to the parsing module and configured to determine associations between the constituent data elements and the multiple data field entry locations. The system also includes a processor configured to preview the constituent data element on the display when a data field entry location associated with the constituent data element is selected and enter the preview into the data field entry location when the preview is confirmed using the user-control device.

16 Claims, 8 Drawing Sheets

| | | | | | |
|---|---|---|---|---|---|
| FPLN ▷ | | | | | |
| Active | | Cross ▷ | | | |
| Crs | Dist | Alt | Ang | Spd | Time |
| 039° | 198 | FL470 | | | |
| GUP | | FL470 | | .78 | 00+28 |
| 038° | 43.9 | FL470 | | | |
| GUP44 | | FL470 | | .78 | 00+05 |
| 041° | 28.7 | FL470 | | | |
| PUMPS | | FL470 | | .78 | 00+03 |
| 041° | 24.1 | FL470 | | | |
| RGINA | | FL470 | | .78 | 00+03 |

✛ DIRECT

FIG. 7

AIRCRAFT DATA ENTRY SYSTEM

TECHNICAL FIELD

The present disclosure generally relates to the field of data entry systems. More particularly, the present disclosure relates to data entry systems for use in aircraft.

BACKGROUND

Data entry is an important aspect of modern aviation. One example of when data entry is required is the entry of Air Traffic Control (ATC) information, such as ATC clearances, into an onboard flight computer. Conventionally, in order to record ATC clearances relating to, for example, which runway of an airport to land on, the correct barometer pressure setting to be used in the landing procedure and so on, the aircraft pilot manually enters these clearances into an onboard computer after receiving these clearances from ATC personnel. In particular, ATC personnel may communicate these instructions verbally by way of a transmission means such as a radio, or via text instructions by way of a Controller Pilot Data Link Communications (CPDLC) protocol.

Manual entry of ATC clearances into the onboard computer increases the workload of the pilot. Furthermore, these clearances may be received only shortly before the pilot must begin landing preparation procedures, thereby disadvantageously increasing the pilot's workload at a time where the pilot's workload is already high. The manual entry of the ATC clearances by the pilot may therefore be inconvenient for the pilot, and may increase the likelihood of data entry errors by the pilot.

Data entry errors may also occur when adverse aircraft conditions result in difficulty in entering the data into the onboard computer. For example, in low-light or turbulent conditions, data entry operations may be impeded, and the likelihood of a data entry error (such as an inadvertent transposing of digits) may consequently increase.

It is therefore desirable to reduce the likelihood of data entry errors occurring during the data entry procedure, and also to reduce pilot workload in entering data.

BRIEF SUMMARY

This summary is provided to introduce a selection of concepts in a simplified form that are further described below in the detailed description section.

In an exemplary embodiment, there is provided a data entry system. The data entry system includes a user-control device operably coupled to a display. The display is configured to display a plurality of data field entry locations. The data entry system also includes a receiving module configured to receive input data. The data entry system also includes a parsing module operably connected to the receiving module and configured to parse the input data and identify constituent data elements in the parsed input data. The data entry system also includes a contextual tagging module operably connected to the parsing module and configured to determine associations between the constituent data elements and the multiple data field entry locations. The data entry system also includes a processor. The processor is configured to, on the basis of the determined associations, preview at least a portion of a constituent data element on the display when a data field entry location associated with the constituent data element is selected using the user-control device and enter the preview into the data field entry location when the preview is confirmed using the user-control device.

In another exemplary embodiment, there is provided method of entering data into a data entry field location displayed on a display. The method includes the step of receiving input data. The method also includes the step of, using a parsing module, parsing the input data into constituent data elements. The method also includes the step of, using a contextual tagging module, determining associations between the constituent data elements and multiple data entry locations. The method also includes the step of, using a user-control device, selecting a data entry field location on the display. The method also includes the step of, using a processor, previewing at least a portion of a constituent data element associated with the selected data entry field location; and upon user confirmation of the preview, entering the preview into the selected data entry field location.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein:

FIG. 7 shows another exemplary display of a data-entry system in accordance with various embodiments;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Furthermore, there is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
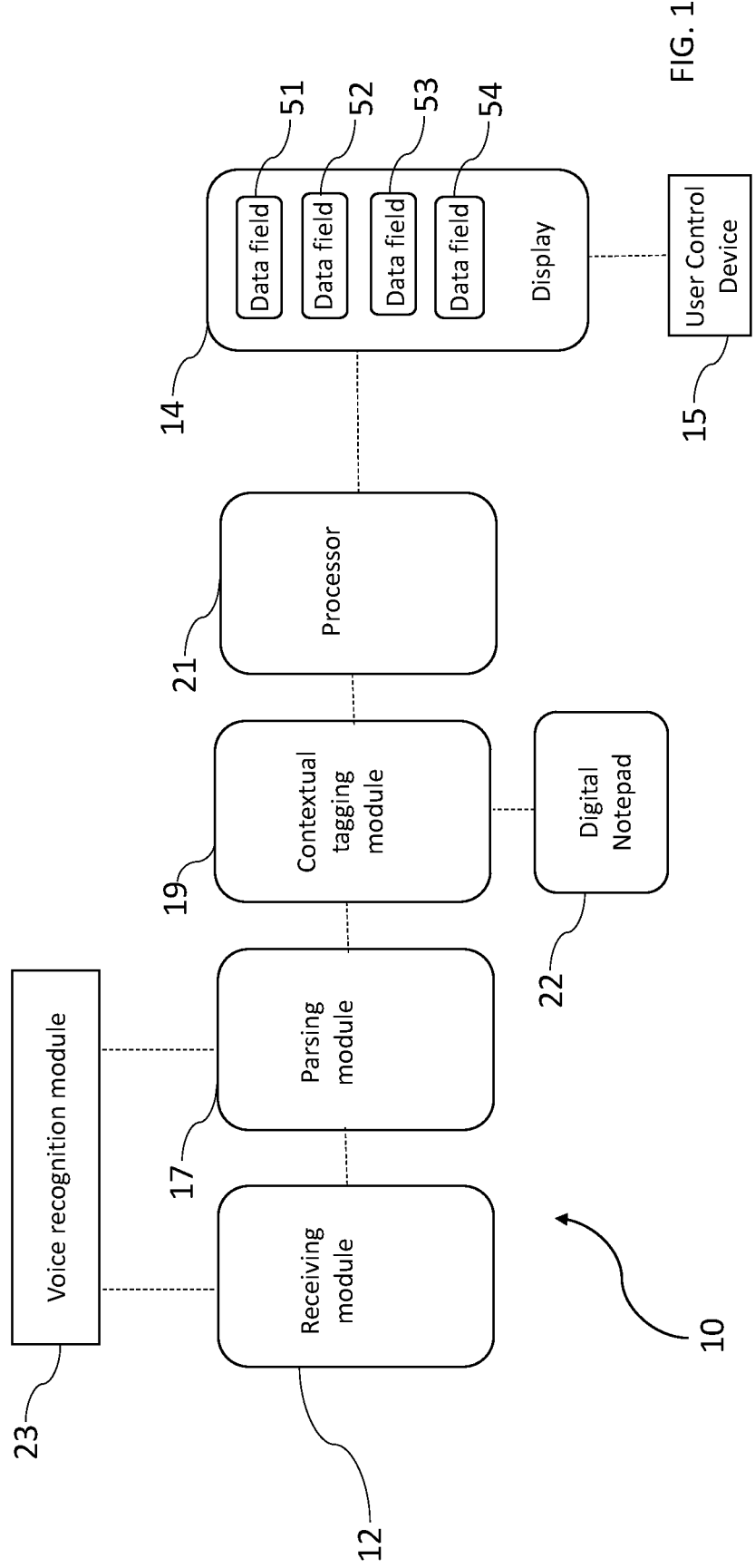
FIG. 1 shows a functional block diagram of a data-entry system in accordance with various embodiments.

FIG. 1 shows a schematic of a data-entry system 10 for an aircraft in accordance with various embodiments. The data-entry system 10 includes a receiving module 12. The receiving module 12 is configured to receive input data from an off-board location, such as a data transmission from an air traffic control (ATC) tower. In exemplary embodiments, the input data received by the receiving module 12 includes text data and/or audio data. In an exemplary embodiment, the input data includes a textual data string. In exemplary embodiments, the textual data string is transmitted by a Controller Pilot Data Link Communications (CPDLC) protocol. In exemplary embodiments, the receiving module 12 is configured to receive input data through the medium of radio wave transmissions, such as HF or VHF radio transmissions.

The data-entry system 10 also includes a display 14. The display 14 is configured to display a plurality of data field entry locations 51-54 to a pilot. In an exemplary embodiment, the display 14 includes a computer screen. In exemplary embodiments, the data field entry locations 51-54 are visually distinct locations, each of which locations are visually associated with a certain aircraft parameter, for example a barometer setting. In exemplary embodiments, each one of the data field entry locations 51-54 is selectable by the pilot through the use of a user-control device 15. In various exemplary embodiments, the user-control device 15 includes a physical or optical trackball, a joystick, a touchscreen, a multifunction control and display unit (MCDU), and so on.

A pilot is able to manipulate the user-control device 15 in order to select various different data field entry locations 51-54. For example, the pilot may move a trackball of the user control device 15 to manipulate a cursor (not shown) displayed on the display 14. As will be explained in more detail below, the position of a displayed cursor on the display 14 may be used to select various different field entry locations. For example, in an exemplary embodiment, when a cursor is manipulated on the display 14 by the pilot to be positioned on top of a particular data field entry location, that data entry field location is registered as being selected. In other exemplary embodiments, a single screen press in a predetermined position on a touchscreen is configured to select a particular data entry field location.

In exemplary embodiments, the user-control device 15 also includes an input device such as a physical or virtual keyboard for inputting data into the various different data field entry locations 51-54.

The data-entry system 10 also includes a parsing module 17. The parsing module 17 is operably connected to the receiving module 12 so as to receive input data from the receiving module 12. The parsing module 17 is configured to parse the input data received by the receiving module 12 into constituent data elements. In an exemplary embodiment, the input data is a textual data string, and the parsing module 17 is configured to identify the constituent text elements that make up the input textual data string. For example, the input data to the parsing module 17 may be a textual data string of the form "AIRCRAFT INFORMATION LIMA'S NOW CURRENT SAVANNAH ALTIMETER TWO NINE NINE TWO".

The parsing module 17, upon receiving this input data string from the receiving module 12, is configured to split the text of this textual data string into its constituent text data elements. In an exemplary embodiment, the parsing module 17 uses a natural language processing algorithm to identify key words in the textual data string and associated information related to those key words. For example, in the textual data string above, the parsing module 17 identifies the key word "ALTIMETER" in the textual data string and the associated information "TWO NINE NINE TWO" to separate out the constituent data element "ALTIMETER TWO NINE NINE TWO" from the textual data string. In this example, the parsing module 17 is also configured to identify the terms "TWO NINE NINE TWO" as natural numbers "2992", such that the constituent data element is stored by the parsing module 17 as "ALTIMETER 2992". The parsing module 17 is further configured to identify and separate out the remaining constituent data elements in the textual data string in the same manner.

After identification and separation of the constituent data elements in the textual data string, the parsing module 17 is configured to temporarily or permanently store the constituent data elements in a permanent or temporary memory. In an exemplary embodiment, the constituent data element is stored in RAM associated with the parsing module 17.

In order to perform parsing of the textual data string, in exemplary embodiments the parsing module 17 uses an artificial neural network that is pre-trained using machine learning techniques to identify key words and recognized clauses in the textual data string. In an exemplary embodiment, this pre-training may be performed on a set of training data where the association between certain textual data and key words is pre-defined. In other exemplary embodiments, the parsing module 17 uses natural language processing algorithms to perform the parsing of the textual data string.

The data-entry system 10 also includes a contextual tagging module 19 operably connected to the parsing module 17. The contextual tagging module 19 is configured to determine associations between the constituent data elements identified and separated out by the parsing module 17 and the multiple data field entry locations 51-54 on the display 14.

In an exemplary embodiment, the contextual tagging module 19 is configured to use correlations between pre-defined key words identified in the constituent data elements and pre-defined "known" terms and clauses to determine an association between a constituent data element and a particular data entry field location on the display 14. For example, continuing with the above example, the constituent data element "ALTIMETER 2992" was identified by the parsing module 17 as containing the pre-defined key word "ALTIMETER". The contextual tagging module 19 identifies the key word "ALTIMETER" and associates, using an association algorithm, this constituent data element containing this key word with the data entry field location for a barometer setting on the display 14.

In an exemplary embodiment, the contextual tagging module 19 is configured to determine this association using a semantic dictionary algorithm that may determine associations between a variation or a misspelling of a predetermined term and the predetermined term itself. For example, if the constituent data element identified by the parsing module 17 were to contain the keyword "BAROMETER" instead of the keyword "ALTIMETER", the contextual tagging module 19 would determine that the term "BAROMETER" is a variation of the pre-defined term "ALTIMETER". The contextual tagging module 19 would then determine an association between the constituent data element containing the keyword "BAROMETER" and the associated data entry field location for an altimeter instruction on the display 14.

In exemplary embodiments, pre-determined notes stored on a digital notepad 22 that is operably connected to the contextual tagging module 19 may be incorporated into the determination of an association between a constituent data element and a data entry location shown on the display 14. In an exemplary embodiment, the pre-determined notes stored on the digital notepad 22 provide further context about a particular word in the textual data string. For example, the digital notes stored on the digital notepad 22 may instruct the contextual tagging module 19 that a particular term or word used in a constituent data element means that the constituent data element corresponds to a particular data entry location 51-54. In particular, the pre-determined notes on the digital notepad 22 may specify that the term "ALTIMETER" in a constituent data element corresponds to the data entry location for a barometer setting. In an exemplary embodiment, the digital notepad 22 may be updated by the pilot at any time.

The data entry system 10 further includes a processor 21 operably connected to the contextual tagging module 19. The processor 21 is configured to receive the associations between the constituent data elements and data entry field locations 51-54 determined by the contextual tagging module 19. After receiving these determined associations, the processor 21 is configured to preview at least a portion of the constituent data element associated with a particular data entry location when that particular data entry location is selected using the user control device 15.

Continuing with the above example, the contextual tagging module 19 may determine that the constituent data element "ALTIMETER 2992" is associated with the barometer setting data entry location. After receiving this determined association, the processor 21 is configured to determine that the portion "2992" of this constituent data element should be displayed when the altimeter data entry location is selected using the user-control device 15. Still further, in exemplary embodiments, the processor 21 is configured to compare the portion of the constituent data element to a pre-determined range of values for the associated data entry location. For example, the processor 21 may determine that the value "2992" lies outside a pre-defined range of barometer setting values for the barometer setting data entry field location. The processor 21 is then configured to adapt the portion of the constituent data element such that the portion lies within the pre-defined range for that data entry field location. For example, for the portion of the constituent data element "2992", the processor 21 is configured to determine that the value "2992" lies outside of the pre-defined range for the barometer setting data entry location and adapts the portion to instead be "29.92".

Figure 2:
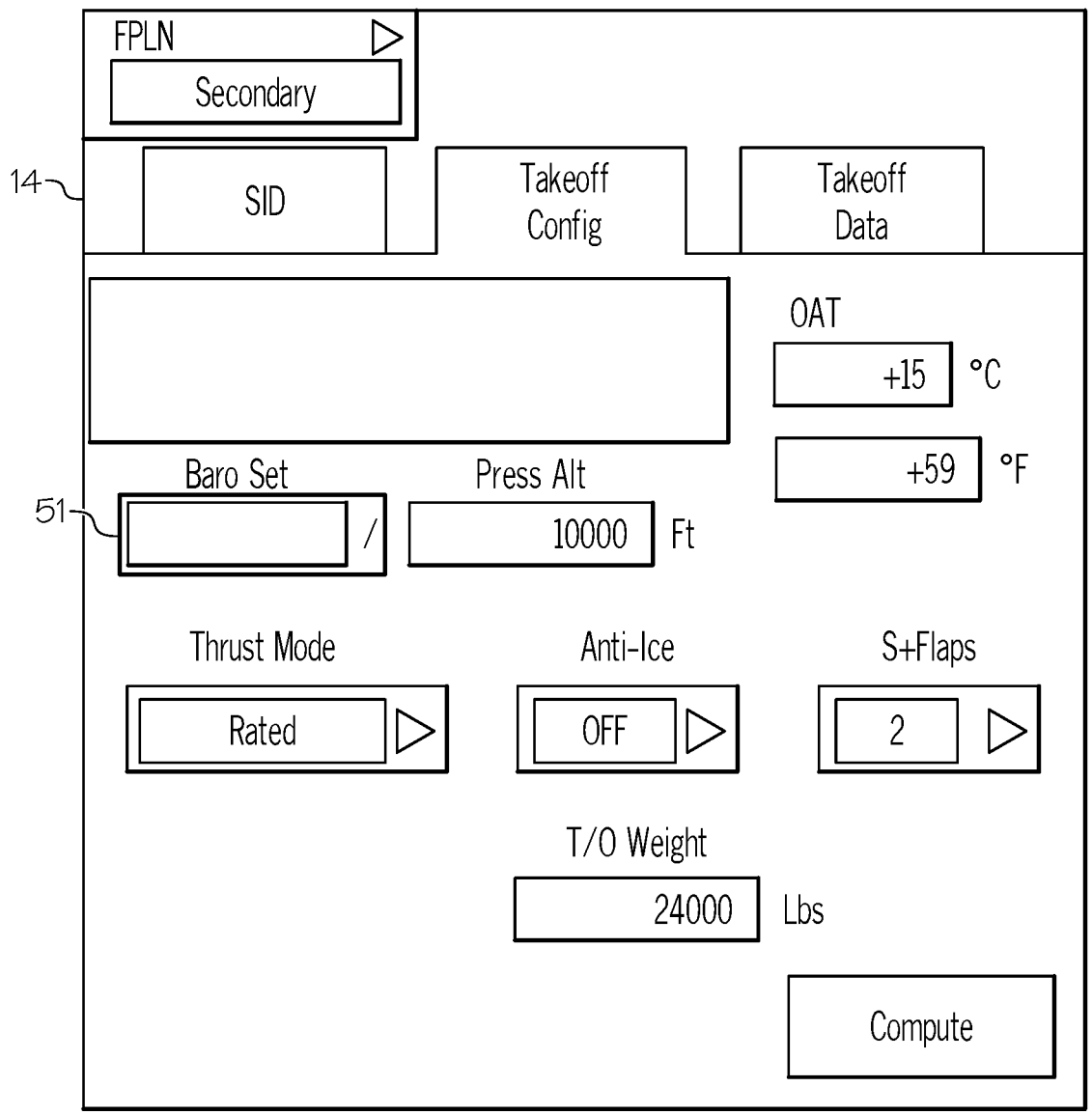
FIG. 2 shows an exemplary display of a data-entry system in accordance with various embodiments.
Figure 3:
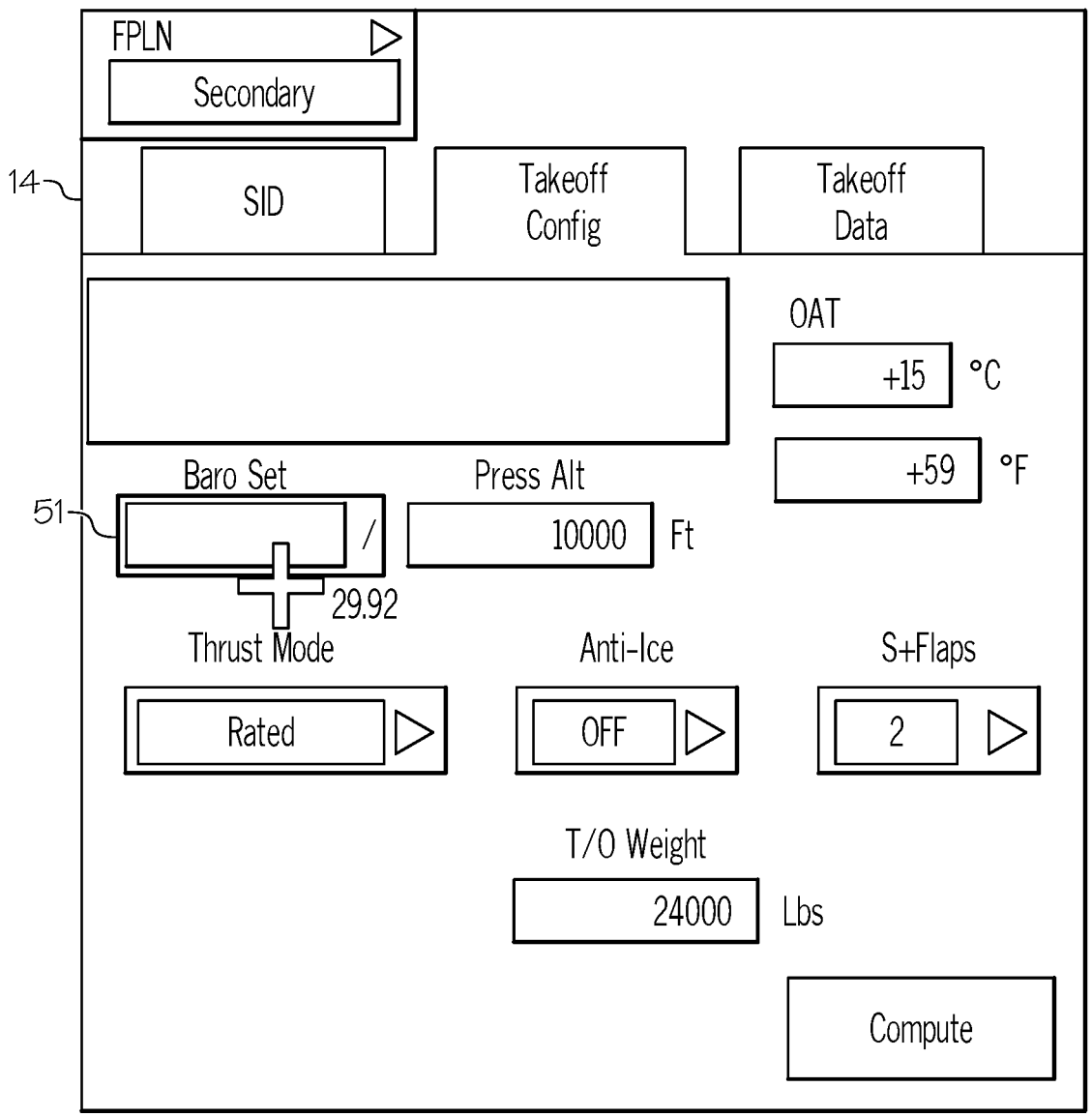
FIG. 3 shows another exemplary display of a data-entry system in accordance with various embodiments.
Figure 4:
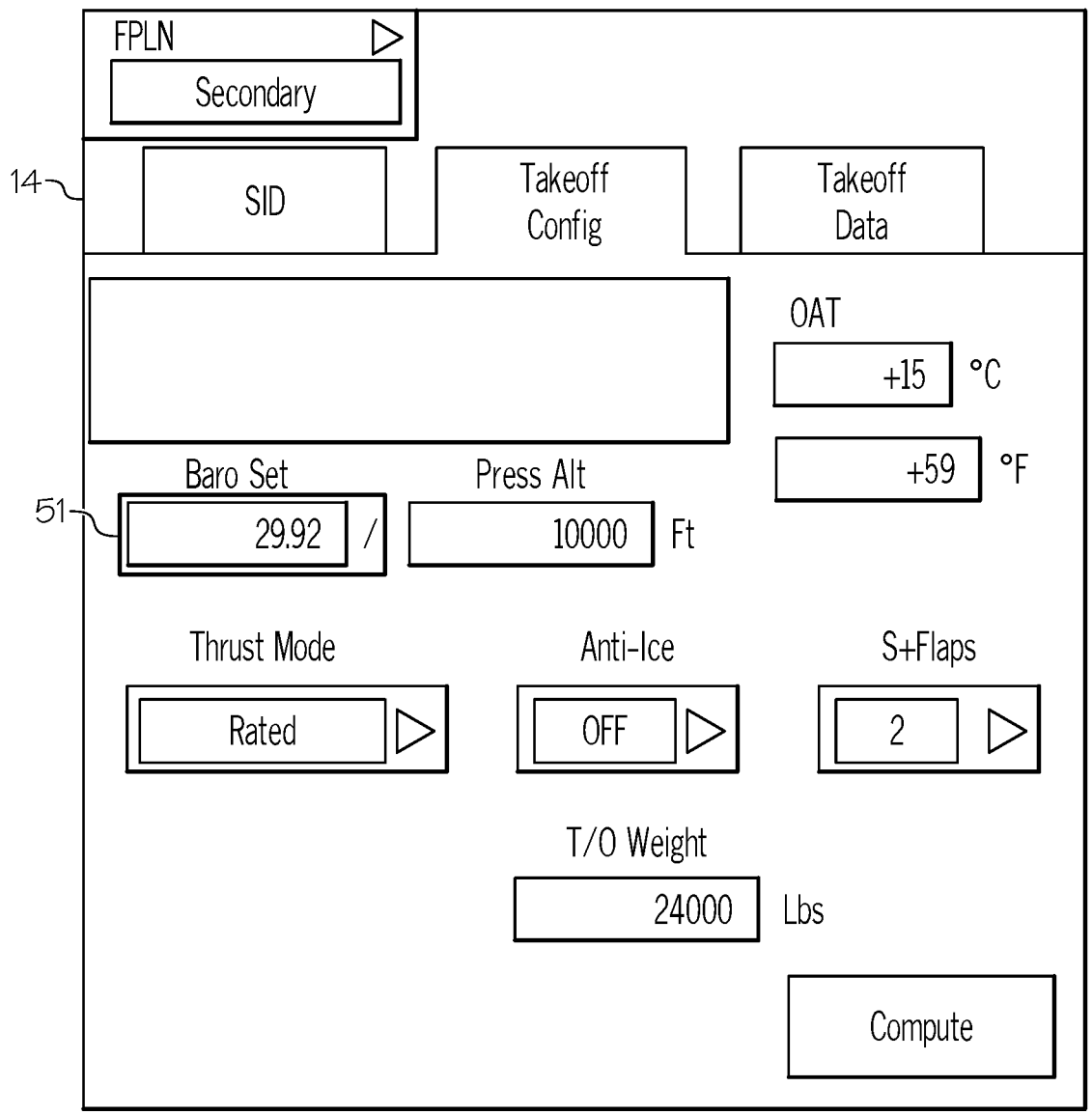
FIG. 4 shows another exemplary display of a data-entry system in accordance with various embodiments.

An example preview of the portion of the constituent data element is shown in FIGS. 2 to 4. As can be seen in FIG. 2, the display 14 contains multiple data entry locations. One of these data entry locations (shown within a representative bold line and indicated with the reference numeral 51) corresponds to a barometer setting entry field location. As shown in FIG. 3, when the barometer setting entry field location is selected using a user control device, for example by positioning a cursor over the barometer setting entry field location, a portion of the constituent data element "ALTIMETER 2992" is previewed to the pilot. In particular, the constituent data element "ALTIMETER 2992" has been determined by the contextual tagging module 19 to be associated with the barometer data entry location and has been determined by the processor 21 to correspond to a barometer value of 29.92. As such, a preview of the value "29.92" is displayed to the pilot when the barometer setting entry field location is selected by the pilot with the user-control device 15.

After the preview of 29.92 is displayed to the user using the user-control device, the user may confirm the previewed portion of the constituent data element, also using the user-control device. In an exemplary embodiment, the confirmation of the previewed portion of the constituent data element corresponds to a button press on a keyboard or mouse when a cursor is positioned above the selected data entry field location. In another exemplary embodiment, the confirmation of the previewed portion of the constituent data element corresponds to a subsequent screen press on a touchscreen of the display.

By requiring a confirmation to enter the preview into the selected data entry field location, a cross-check of the correctness of the preview may be performed. In particular, the pilot is able to view the original textual data string initially received by the receiving module 12 and compare the data in this textual data string to the preview. As such, on the basis of this comparison, the pilot can ensure that the correct terms have been included in the constituent data element by the parsing module 17 and that the correct association between the constituent data element and the data entry field location has been determined by the contextual tagging module 19.

When the previewed portion of the constituent data element is confirmed by the pilot using the user-control device 15, the portion of the constituent data element is entered into the associated data field entry location. An exemplary display is shown in FIG. 4 after a confirmation of the previewed portion of the constituent data element was performed by the pilot. As can be seen in FIG. 4, the previewed portion of the constituent data element "29.92" has been entered into the data field entry location corresponding to the barometer setting.

As will be appreciated, since multiple constituent data elements may be contained in the input data, selecting different data field entry locations will cause portions of different constituent data elements to be previewed. Multiple different constituent data elements, associated with multiple different data field entry locations, may be stored in the processor at a single time.

As has been explained above, the data-entry system 10 allows for a semi-automatic data entry of data contained in a textual data string into data entry field locations displayed on a display 14, which data entry process only requires a user-controlled selection of a particular data entry field location and a confirmation of a preview which is displayed when a particular data entry field location is selected.

However, it is noted that data received by the receiving module 12 may not always be in the format of a textual data string. In some situations, the receiving module 12 may receive input data corresponding to audible data, such as audio or voice instructions received from a local ATC tower via HF or VHF radio bands.

As can be seen in FIG. 1, in order to allow for a semi-automatic data entry of data contained in received audio or voice instructions, in various exemplary embodiments the data entry system 10 includes a voice recognition module 23 operably connected to the receiving module 12 and being configured to generate a textual data string from voice and/or audio data.

Figure 5:
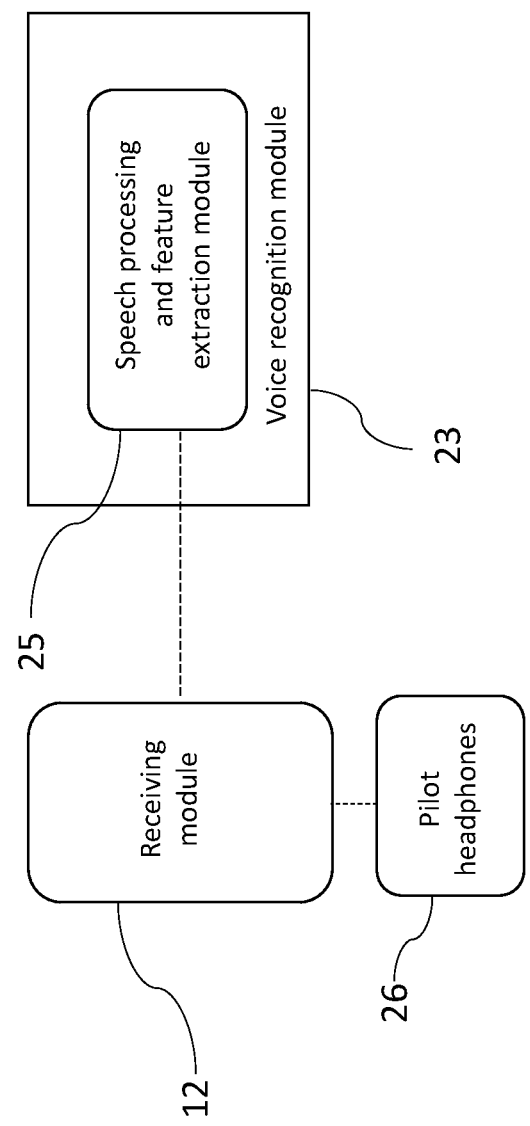
FIG. 5 shows an exemplary voice recognition module in accordance with various embodiments.

An exemplary voice recognition module 23 is shown in FIG. 5. In exemplary embodiments, the voice recognition system 23 includes a speech processing and feature extraction module 25 operably connected to the receiving module 12, which, in an exemplary embodiment, includes a radio receiver. Voice and/or audio data received at the receiving module 12 is transmitted to the speech processing and feature extraction module 25. In an exemplary embodiment, pilot headphones 26 are also operably connected to the receiving module 12, so the pilot can hear the received voice and/or data.

The speech processing and feature extraction module 25 is configured to recognize words and phrases in the received voice and/or audio data and convert these words and phrases into a textual data string. Conventional speech recognition techniques may be used to generate the textual data string on the basis of the received voice and/or audio data.

It is noted that, since the terminology used in ATC communications may be more limited than the terminology used in everyday language, training of the speech processing and feature extraction module 25 on test voice data using, for example, an artificial neural network, may result in the speech recognition algorithms used in the speech processing and feature extraction module 25 having a relatively high accuracy as compared to general-purpose speech recognition algorithms.

In an exemplary embodiment, the speech processing and feature extraction module 25 generates the textual data string through the recognition of certain key words, for example "ALTIMETER". In exemplary embodiments, the speech processing and feature extraction module 25 incorporates natural language processing algorithms to generate the textual strong data from the voice and/or audio data.

In an exemplary embodiment, the speech processing and feature extraction module 25 is speaker independent, in that the speech processing and feature extraction module 25 is not trained in the recognition of a particular speaker's voice. With a speaker-independent system, errors are less likely to occur due to the idiosyncrasies of a particular speaker's voice.

As shown in FIG. 1, after the textual data string is generated by the speech processing and feature extraction module 25, the textual data string is then transmitted to the parsing module 17, where the textual data string is parsed into separate constituent data elements in the same manner as described above.

Figure 6:
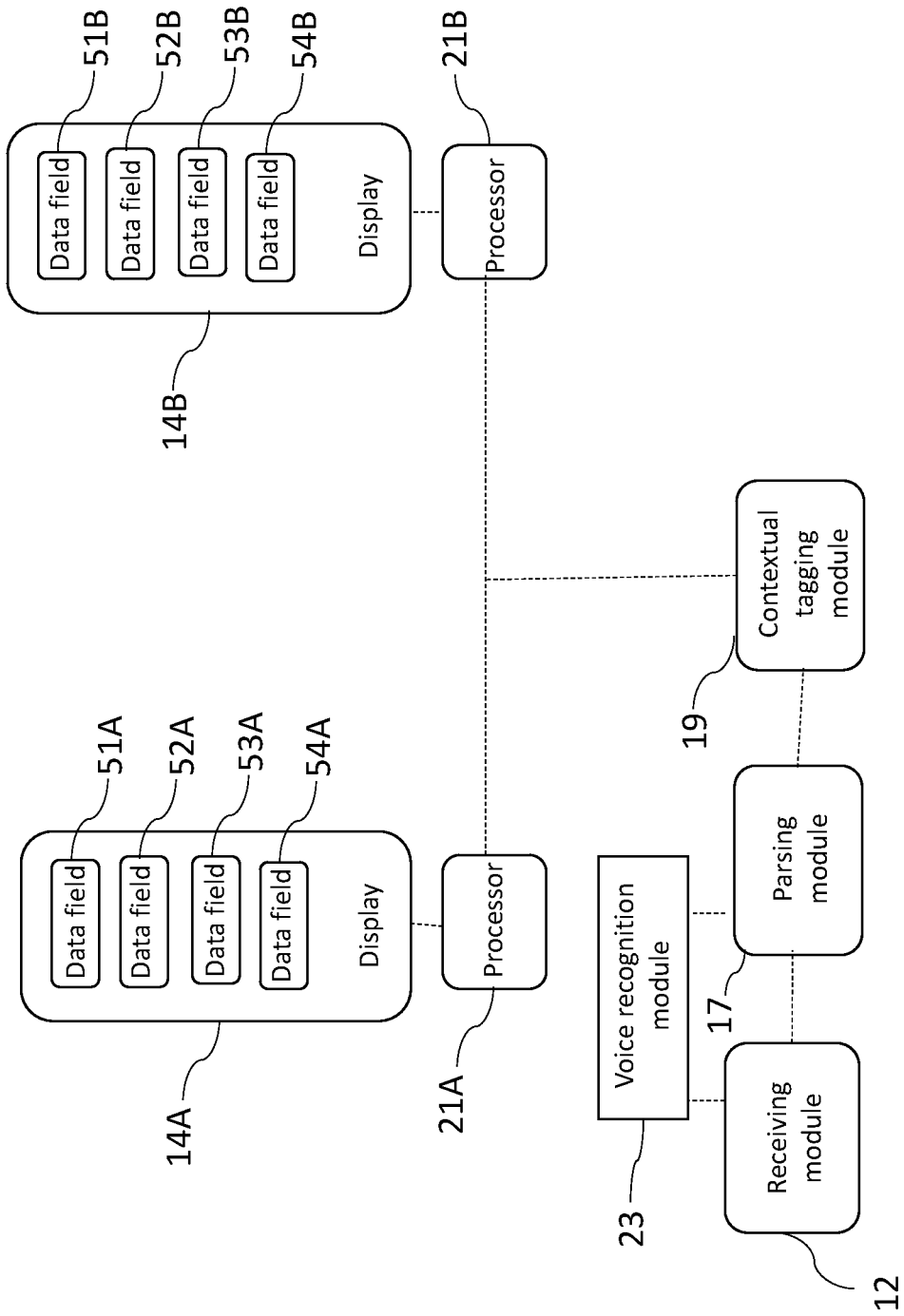
FIG. 6 shows another functional block diagram of a data-entry system in accordance with various embodiments supporting multiple data entry field locations.

Another data-entry system incorporating a voice recognition module 23 is shown in FIG. 6. As can be seen in FIG. 6, in exemplary embodiments multiple data entry field locations 51A-54A may be present on a pilot's display 14A and further multiple data entry field locations 51B-54B may be present on a first officer's display 14B. By duplicating the multiple data entry field locations 51A-54D, 51A-54D, multiply redundant checks may be introduced into the data-entry process.

In operation, an ATC voice instruction transmitted via HF or VHF or an ATC text instruction transmitted by CPDLC is received at the receiving module 12. If the ATC instruction is a voice instruction, the ATC instruction is transmitted to the voice recognition module 23 for conversion into a textual data string. In particular, a speech processing and feature extraction module (not shown in this figured) converts the voice instruction into a textual data string in the above-described manner. A parsing module 17 then parses the textual data string and identifies constituent data elements in the textual data string in the above-described manner. Associations between the constituent data elements and multiple data entry locations on one or both of the displays 14A, 14B are then determined by the contextual tagging module 19. Processors 21A, 21B associated with each one of the displays 14A, 14B then preview, on the basis of the determined associations, at least a portion of the associated constituent data element on the display when a particular data entry field location 51A-54A, 51B-54B is selected by a user-control device associated with the corresponding display 14A, 14B. For example, if the data field entry location 51A is selected on the pilot's display 14A using the pilot's user-control device, a portion of the constituent data element associated with the data field entry location 51A is previewed to the pilot.

If the preview is confirmed by the pilot through a confirmation effected via the pilot's user-control device, the previewed portion of the constituent data element is entered into the data field entry location 51A. Similarly, if the data field entry location 51B is selected on the first officer's display 14B using the first officer's user control device, a portion of the constituent data element associated with the data field entry field location 51B is previewed to the pilot. If the preview is confirmed by the first officer through a confirmation effected via the first officer's user-control device, the previewed portion of the constituent data element is entered into the data field entry location 51B. In this manner, the workload of each of the pilot and the first officer in entering data into the multiple data entry field locations is reduced. By using a shared receiving module 12, parsing module 17, voice recognition module 23 and contextual tagging module 19 for each of the displays 14A and 14B, the total number of components in the data entry system 10 may be reduced. In exemplary embodiments, a confirmation from the pilot may be requested in order to enter preview data on the first officer's display, or vice versa, in order to introduce a further check in the data-entry process and further decrease the likelihood of data entry errors.

If the previewed portion of the associated constituent data element does not conform to the ATC voice instruction received by the pilot's headphones, and a correction is required, the pilot is able to modify the entered portion of the constituent data element using the pilot user control device. In exemplary embodiments, the first officer is also able to modify the entered portion of the constituent data element using the first officer user control device Referring now to FIG. 7, in exemplary embodiments, the data entry system 10 may be used to reduce pilot workload in other flight scenarios. For example, the ATC instruction, which may be a text instruction sent via CPDLC or a voice instruction sent via VF or VHF, may relate to a flight instruction directing for a change in the flight plan of the aircraft in order to route the aircraft to a particular waypoint. An example of such an ATC instruction may be "DELTA TWENTY FOUR ZERO FIVE CLEARED DIRECT PUMPS DESCEND AND MAINTAIN FLIGHT LEVEL THREE ZERO ZERO".

In this example ATC instruction, the parsing module 17 identifies the keyword "DIRECT" and the associated text "PUMPS" as a constituent data element contained within this textual data string. The contextual tagging module 19 determines an association between this constituent data element and the data entry field location "ATC instruction to DIRECT-TO". The processor 21 is configured, upon selection of the relevant waypoint "PUMPS" in the data entry field location, which in this case is the waypoint list, the portion of the constituent data element "DIRECT-TO". The pilot may then confirm this previewed portion using the pilot user-control device in order to enter the previewed portion "DIRECT-TO" into the selected data field entry location, thereby confirming that a "direct-to" operation should be performed with respect to the waypoint "PUMPS". In exemplaray embodiments, after pilot confirmation of the previewed portion of the constituent data element corresponding to the instructed waypoint, the processor 21 instructs for a "DIRECT-TO" operation to the waypoint "PUMPS" in the pending flight plan.

Figure 8:
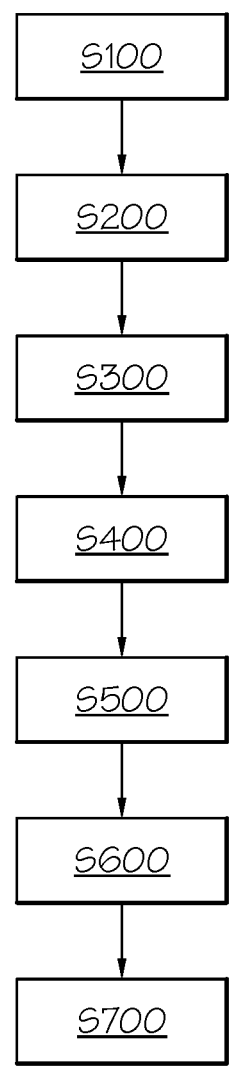
FIG. 8 shows a flowchart of a method in accordance with various embodiments.

A flowchart of a method for entering data into a data entry field location is shown in FIG. 8. At step S100, a command is received. In exemplary embodiments, the command is a text command, which may be transmitted via CPDLC. In alternative embodiments, the command is a voice command, which may be transmitted via HF or VHF.

At step S200, the command is parsed into constituent data elements. In exemplary embodiments, the parsing is performed through the identification of pre-determined key words. In alternative exemplary embodiments, the parsing is performed using natural language processing.

At step S300, associations between the constituent data elements and multiple data entry locations are determined. In exemplary embodiments, the associations are determined on the basis of key-word analysis.

At step S400, a data entry field location is selected on a display. In exemplary embodiments, the data entry field location is selected using a user control device, for example a mouse that controls the position of a cursor on the display or a touchscreen. In an exemplary embodiment, a cursor "hover over" event indicates the selection of a particular data entry field location. In alternative exemplary embodiments, a "single press" event in a pre-determined location on a touchscreen indicates the selection of a particular data entry field location.

At step S500, at least a portion of the constituent data element associated with the selected data entry field location is previewed. In exemplary embodiments, the previewed portion of the constituent data element corresponds to data that is appropriate for entry into the selected data entry field location. In exemplary embodiments, the previewed portion of the constituent data element is converted into data that is appropriate for entry into the selected data entry field location.

At step S600, a confirmation of the previewed portion of the constituent data element is performed by a user using a user control device. In exemplary embodiments, the previewed portion is confirmed using the user control device, for example a mouse that controls the position of a cursor on the display or a touchscreen. In an exemplary embodiment, a cursor "click" event, when the cursor is positioned over the data entry field location, indicates the confirmation of the previewed portion of the constituent data element for that particular data entry field location. In alternative exemplary embodiments, a "subsequent press" event in a pre-determined location on a touchscreen indicates the confirmation of the previewed portion of the constituent data element for the selected data entry field location.

At step S700, after confirmation of the previewed portion of the constituent data element, the previewed portion of the constituent data element is entered into the selected data entry field location.

Optionally, after entry of the previewed portion of the constituent data element into the selected data entry field, the entered portion may be edited using the user-control device.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A data entry system, comprising:
   a display configured to display multiple data field entry locations;
   a user-control device operably coupled to the display;
   a receiving module configured to receive input data;
   a parsing module operably connected to the receiving module and configured to parse the input data and identify constituent data elements in the parsed input data;
   a contextual tagging module operably connected to the parsing module and configured to determine associations between the constituent data elements and the multiple data field entry locations; and
   a processor, wherein the processor is configured to, on the basis of the determined associations, preview at least a portion of a constituent data element on the display when a data field entry location associated with the constituent data element is selected using the user-control device and enter the preview into the data field entry location when the preview is confirmed using the user-control device.

2. The data entry system of claim 1, wherein the parsing module is configured to parse text input data.

3. The data entry system of claim 1, further comprising a voice recognition system configured to convert audio input data into text input data.

4. The data entry system of claim 1, wherein the user-control device comprises a device to manipulate the location of a cursor on the display, and wherein the processor is configured to register that a data entry field location is selected in response to the cursor being positioned over the data entry field location.

5. The data entry system of claim 4, wherein the processor is configured to register a confirmation of the preview in response to a button press of the user-control device after selection of the data entry field location.

6. The data entry system of claim 1, wherein the user-control device comprises a touchscreen, and wherein the processor is configured to register that a data entry field location is selected in response to a single touchscreen press at a pre-determined location on the touchscreen.

7. The data entry system of claim 6, wherein the processor is configured to register a confirmation of the preview in response to a subsequent touchscreen press at the pre-determined location of the touchscreen.

8. The data entry system of claim 1, wherein the processor is configured to adapt the preview on the basis of a pre-determined acceptable value range for the selected data entry field location.

9. A method of entering data into a data entry field location displayed on a display, the method comprising:
receiving input data;
using a parsing module, parsing the input data into constituent data elements;
using a contextual tagging module, determining associations between the constituent data elements and multiple data entry locations;
using a user-control device, selecting a data entry field location;
using a processor, previewing at least a portion of a constituent data element associated with the selected data entry field location; and
upon user confirmation of the preview, entering the preview into the selected data entry field location.

10. The method of claim 9, wherein the input data is text data.

11. The method of claim 9, wherein the input data is voice data, the method further comprising generating text data from the voice data using voice recognition techniques.

12. The method of claim 9, wherein selecting the data entry field location comprises manipulating a cursor on the display to be located over the data entry field location.

13. The method of claim 12, wherein user confirmation of the preview comprises a button press when the cursor on the display is located over the selected data entry field location.

14. The method of claim 9, wherein selecting the data entry field location comprises pressing a touchscreen in a pre-determined location.

15. The method of claim 14, wherein user confirmation of the preview comprises a subsequent pressing of the touchscreen in the pre-determined location.

16. The method of claim 9, further comprising the step of adapting the preview on the basis of a pre-determined acceptable value range for the selected data entry field location.

* * * * *